United States Patent
Lin et al.

(10) Patent No.: US 11,044,027 B2
(45) Date of Patent: Jun. 22, 2021

(54) WIRELESS TRANSMISSION PERFORMANCE TEST SYSTEM AND METHOD THEREOF

(71) Applicant: AmTRAN Technology Co., Ltd., New Taipei (TW)

(72) Inventors: Chien-Cheng Lin, New Taipei (TW); Chih-Hung Chuang, New Taipei (TW)

(73) Assignee: AmTRAN Technology Co., Ltd., New Taipei (TW)

( * ) Notice: Subject to any disclaimer, the term of this patent is extended or adjusted under 35 U.S.C. 154(b) by 0 days.

(21) Appl. No.: 16/851,072

(22) Filed: Apr. 16, 2020

(65) Prior Publication Data

US 2021/0067257 A1    Mar. 4, 2021

(30) Foreign Application Priority Data

Sep. 2, 2019    (TW) .................................. 108131564

(51) Int. Cl.
| | | |
|---|---|---|
| H04B 17/00 | (2015.01) | |
| H04B 17/29 | (2015.01) | |
| H04B 17/12 | (2015.01) | |
| H04W 24/10 | (2009.01) | |
| H01Q 1/24 | (2006.01) | |

(52) U.S. Cl.
CPC ............ *H04B 17/29* (2015.01); *H01Q 1/241* (2013.01); *H04B 17/0085* (2013.01); *H04B 17/12* (2015.01); *H04W 24/10* (2013.01)

(58) Field of Classification Search
CPC .... H04B 17/29; H04B 17/12; H04B 17/0085; H04W 24/02; H04W 24/10
See application file for complete search history.

(56) References Cited

U.S. PATENT DOCUMENTS

| | | | |
|---|---|---|---|
| 2005/0012675 A1 | 1/2005 | Sakiyama et al. | |
| 2007/0164755 A1* | 7/2007 | Stojcevic | G01R 29/105 324/627 |
| 2010/0285753 A1 | 11/2010 | Foegelle et al. | |
| 2013/0288610 A1* | 10/2013 | Toh | H03F 3/24 455/67.14 |
| 2014/0161164 A1* | 6/2014 | Emmanuel | H04B 5/0043 375/224 |

(Continued)

FOREIGN PATENT DOCUMENTS

| | | |
|---|---|---|
| CN | 2681462 Y | 2/2005 |
| CN | 105980867 A | 9/2016 |

(Continued)

*Primary Examiner* — Tuan Pham
(74) *Attorney, Agent, or Firm* — CKC & Partners Co., LLC

(57) ABSTRACT

A wireless transmission performance test system is provided, configured to test wireless transmission performance of a device under test (DUT) which is disposed in a testing chamber. The wireless transmission performance test system includes a directional antenna and a control device. The directional antenna is disposed inside the testing chamber and adjacent to the DUT to receive testing signal generated by the DUT after testing. The signal coupling direction of the directional antenna is directed to the DUT. The control device is configured to receive the testing signal transmitted from the directional antenna, process the testing signal, and generate testing result. A wireless transmission performance test method is also provided herein.

10 Claims, 4 Drawing Sheets

(56) References Cited

U.S. PATENT DOCUMENTS

| | | | | |
|---|---|---|---|---|
| 2014/0225774 A1* | 8/2014 | Boulton | ............... | G01S 19/23 |
| | | | | 342/357.62 |
| 2014/0256373 A1* | 9/2014 | Hernandez | ............ | H04B 17/27 |
| | | | | 455/509 |
| 2014/0273873 A1 | 9/2014 | Huynh | | |

FOREIGN PATENT DOCUMENTS

| CN | 206379471 U | 8/2017 |
|---|---|---|
| CN | 107643452 A | 1/2018 |
| EP | 1223432 B1 | 3/2005 |

\* cited by examiner

WIRELESS TRANSMISSION PERFORMANCE TEST SYSTEM AND METHOD THEREOF

CROSS-REFERENCE TO RELATED APPLICATION

This application claims priority to Taiwan Application Serial Number 108131564, filed Sep. 2, 2019, all of which are herein incorporated by reference.

BACKGROUND

Field of Invention

The present invention relates to test system and test method. More particularly, the present invention relates to electronic device of wireless transmission function test system and method.

Description of Related Art

As communication technology evolves, a various electronic devices are implemented with functions of wire or wireless communication. Before shipping the electronic devices, the wireless transmission performance of them need to be tested. However, the current test method could not obtain the wireless transmission performance of the electronic devices under the environment at specific temperature, humidity, or the like, for example, under the environment that is extremely cold or extremely hot. As such, when the electronic devices are shipped to other country at the latitude different from where the manufacturer is located, the wireless transmission function of electronic devices may be different from that have been tested at the manufacturer.

SUMMARY

A wireless transmission performance test system is provided by the present disclosure, configured to test wireless transmission performance of a device under test (DUT) which is disposed in a testing chamber. The wireless transmission performance test system includes a directional antenna and a control device. The directional antenna is disposed inside the testing chamber and adjacent to the DUT to receive testing signal generated by the DUT after testing. The signal coupling direction of the directional antenna is directed to the DUT. The control device is coupled to the directional antenna. The control device is configured to receive the testing signal transmitted from the directional antenna, process the testing signal, and generate testing result. The material inside the testing chamber is metal.

A wireless transmission performance test method is also provided by the present disclosure, for testing wireless transmission performance of a device under test (DUT). The wireless transmission performance test method includes the steps as follows. Disposing a directional antenna and the DUT inside a testing chamber, wherein signal coupling direction of the directional antenna is directed to the DUT; disposing a control device coupled to the directional antenna; receiving testing signal from the DUT by the directional antenna; and receiving the testing signal transmitted from the directional antenna by the control device, processing the testing signal, and generating testing result by the control device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
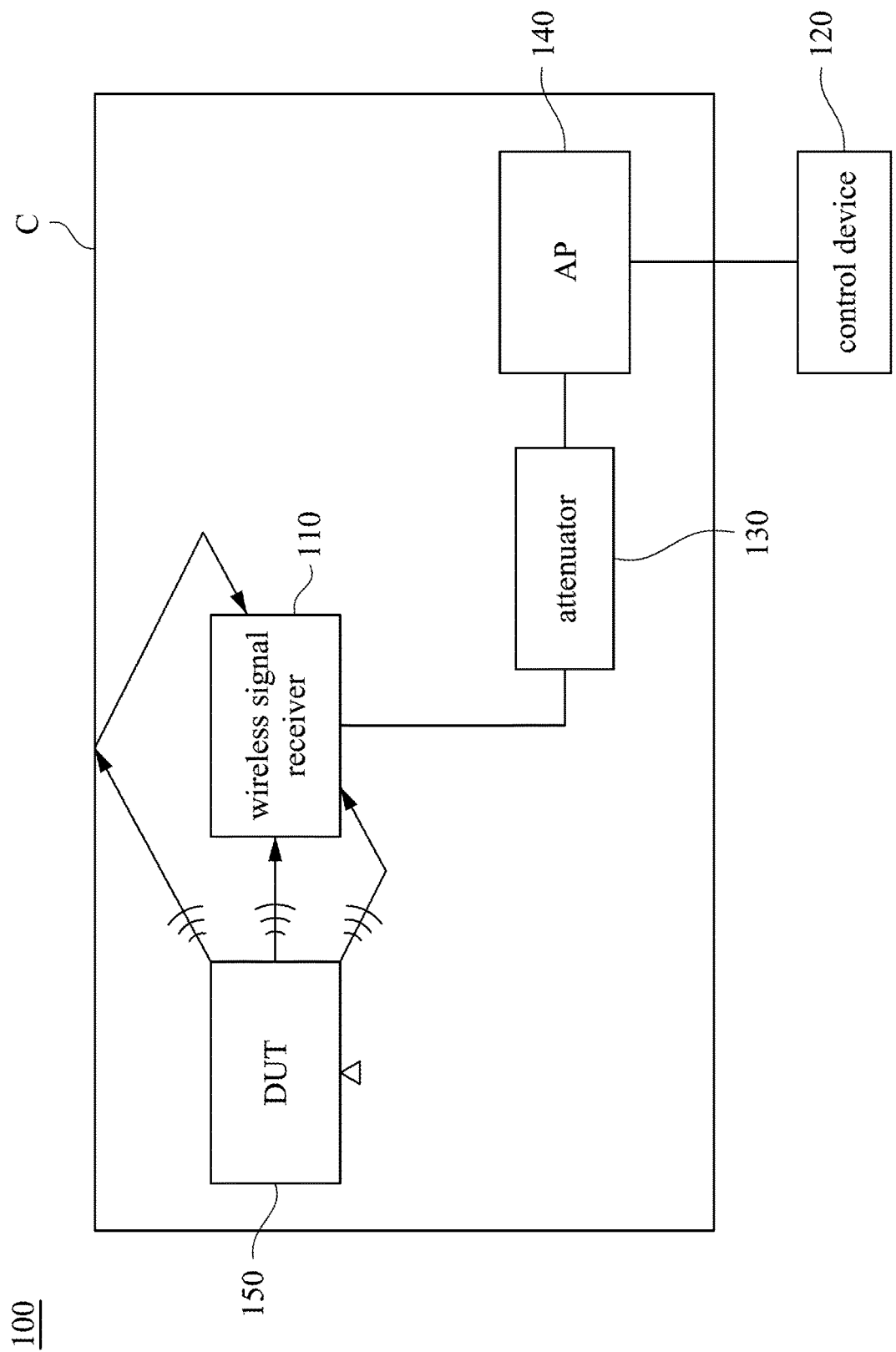
FIG. 1 is a block diagram of wireless transmission performance test system, in accordance with one embodiment of the present disclosure.

Reference will now be made in detail to embodiments of the present disclosure, examples of which are described herein and illustrated in the accompanying drawings. While the disclosure will be described in conjunction with embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. It is noted that, in accordance with the standard practice in the industry, the drawings are only used for understanding and are not drawn to scale. Hence, the drawings are not meant to limit the actual embodiments of the present disclosure. In fact, the dimensions of the various features may be arbitrarily increased or reduced for clarity of discussion. Wherever possible, the same reference numbers are used in the drawings and the description to refer to the same or like parts for better understanding.

In the following description and in the claims, the terms "include" and "comprise" are used in an open-ended fashion, and thus should be interpreted to mean "include, but not limited to." As used herein, the term "and/or" includes any and all combinations of one or more of the associated listed items.

In this document, the term "coupled" may also be termed "electrically coupled," and the term "connected" may be termed "electrically connected." "Coupled" and "connected" may also be used to indicate that two or more elements cooperate or interact with each other.

In general, when the wireless transmission performance of the electronic device test is performed, the electronic device is disposed in a testing chamber, and the wireless transmission performance test system is also arranged, as one embodiment of the present disclosure, configured to test the wireless transmission performance of the electronic device, wherein the electronic device like television, tablet computer, et al.

FIG. 1 is a block diagram of wireless transmission performance test system 100 of the present disclosure. The wireless transmission performance test system 100 includes a wireless signal receiver 110, a control device 120, an attenuator 130, and a wireless access point (AP) 140.

As shown in FIG. 1, the control device 120 is disposed outside the testing chamber C, and the remaining elements including the device under test (DUT) 150, the wireless signal receiver 110, the attenuator 130, and the AP 140, are disposed inside the testing chamber C. The wireless signal receiver 110 is coupled to the electronic device under test (i.e., the DUT 150 as shown in the figure), and the wireless signal receiver 110 is also coupled to the attenuator 130. The attenuator 130 is coupled between the wireless signal receiver 110 and the AP 140, and the AP 140 is coupled to the control device 120.

In prior art, electromagnetic wave absorbing material, such as sponge or protruding structure, is disposed inside the testing chamber which is configured to test the intensity of the wireless testing signal. However, the property of the electromagnetic wave absorbing material is varied under different environmental conditions, such temperature changes or humidity changes inside the testing chamber. The changes of temperature or humidity could cause damage to the electromagnetic wave absorbing material and further leads to the inaccurate testing result. Therefore, the chamber with prior art technology cannot perform the test of the intensity of the wireless signal under various environmental conditions (e.g. at high temperature or high humidity). In order to overcome the temperature and the humidity variation inside the testing chamber, the material inside the testing chamber C is capable of resisting temperature changes and humidity changes, such as metal like stainless steel, in some embodiments of present disclosure. Besides, in various embodiments of the present disclosure, the material inside the testing chamber C is metal, which is adaptive to the different environmental conditions, such as temperature or humidity changes, inside the testing chamber C, and further provides different testing environments for the DUT 150. Therefore, by adjusting environmental conditions inside the testing chamber C, disposing the DUT 150 in various environments with different temperature and humidity can be simulated.

User can set the environmental conditions including temperature, humidity and the like, inside the testing chamber C by user interface (not shown) of the testing chamber C. On the other hand, user can set the testing conditions including turning on or off the functions of Bluetooth, the WIFI and the like, of the DUT 150 by the control device 120. The instructions of completed settings of the testing conditions are transmitted to the DUT 150 through the AP 140. In various embodiments, user can also set the testing conditions of the DUT 150 by the user interface of the DUT 150 directly, which is not limited as above.

Continuing the above description, the DUT 150 outputs the wireless testing signal based on the instructions or settings mentioned above. The wireless signal receiver 110 receives the wireless testing signal, and transmits the wireless testing signal to the AP 140 through the attenuator 130 with wired connection (e.g. cable). The AP 140 transmits the received testing signal to the control device 120 with wired or wireless connection. For instance, the AP 140 may transmit the received testing signal to the control device 120 with Ethernet or wireless connection. Then the control device 120 processes the received testing signal and generates the testing result, in order to obtain the wireless transmission performance of the DUT 150. In this embodiment, the AP 140 is coupled to the control device 120 with wired connection (e.g. Ethernet).

As shown in FIG. 1, when the DUT 150 outputs the testing signal, the testing signal could be provided with multipath since the many phenomenon including reflection and scattering are occurred inside the testing chamber C with metal material. As such, the wireless signal receiver 110 would not only receive the testing signal with line-of-sight (LOS) transmitted directly from the DUT 150, but receive the testing signal with different intensity and phase which are reflected or scattered from inside of the testing chamber C.

Figure 2:
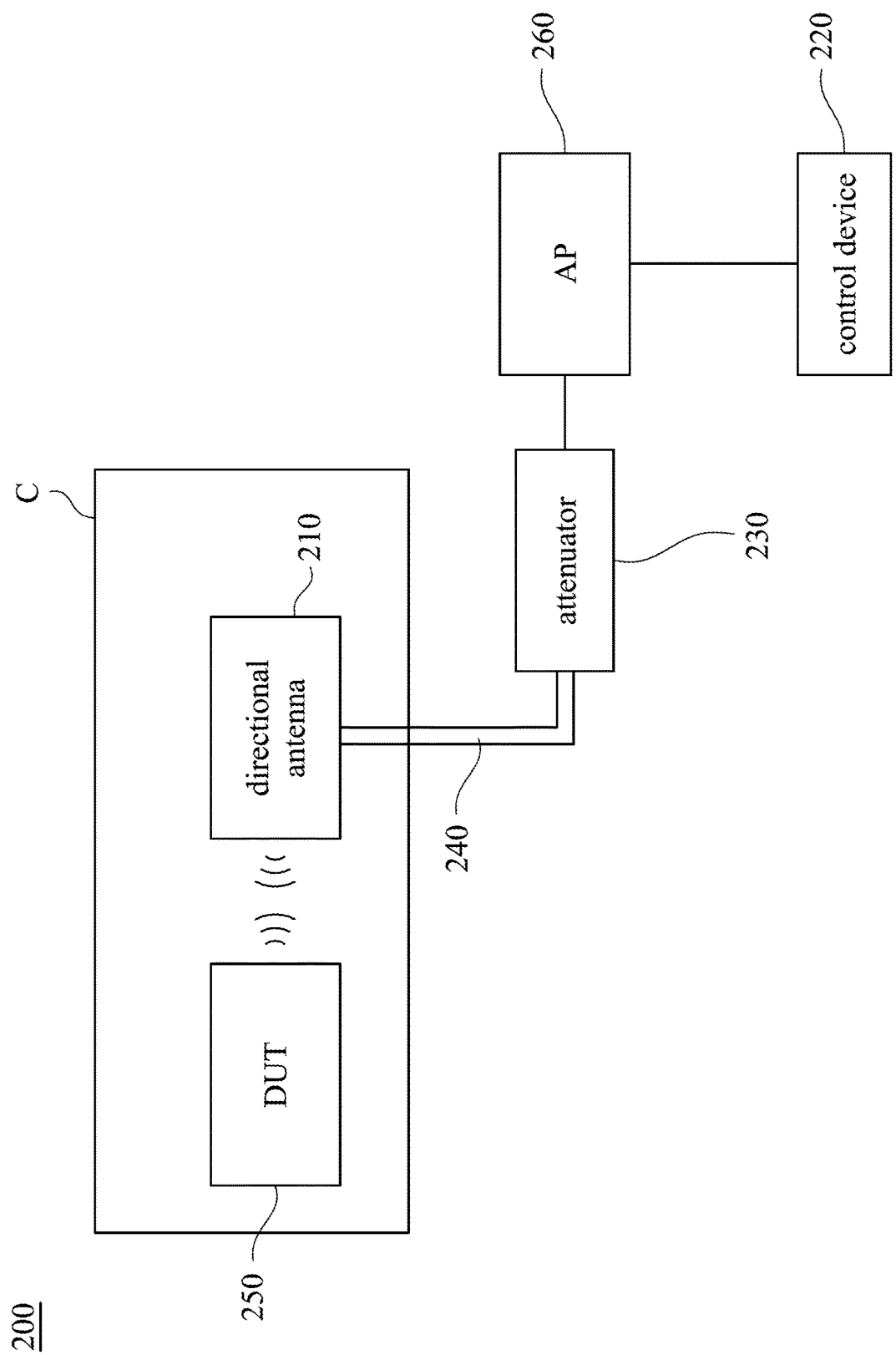
FIG. 2 is a block diagram of wireless transmission performance test system, in accordance with one embodiment of the present disclosure.

In order to test the wireless transmission performance of the DUT 150 under specific and default environmental conditions including temperature and humidity, in some embodiments, the material inside the testing chamber C where the DUT 150 is selected as metal. In order to obtain the appropriate testing signal for processing and analyzing and further obtaining the correct testing result, one embodiment as shown as FIG. 2 is provided in the present disclosure. As shown in FIG. 2, the wireless transmission performance test system 200 includes a directional antenna 210, an attenuator 230, an AP 260 and a control device 220. The directional antenna 210 is disposed inside the testing chamber C, and the remaining elements including the attenuator 230, the AP 260 and the control device 220, are disposed outside the testing chamber C. The directional antenna 210 is coupled to the DUT 250 and is coupled to the attenuator 230 through the transmission line 240. The attenuator 230 is coupled to the directional antenna 210 through the transmission line 240 and is coupled to the AP 260. The AP 260 is coupled to the control device 220.

As shown in FIG. 2, the DUT 250 and the directional antenna 210 are disposed inside the testing chamber C. The DUT 250 and the directional antenna 210 are disposed at positons that are adjacent to each other. In some embodiments, the directional antenna 210 is mono-polarized, which is configured to receive the wireless signal with single polarized direction. In some embodiments, the signal coupling direction of the directional antenna 210 is directed to the DUT 250, which is configured to receive the testing signal generated by the DUT 250 during the testing. Namely, during the testing, the directional antenna 210 may receive the testing signal with LOS outputted from the DUT 250, and avoid receiving the testing signal with multipath generated from inside of the testing chamber C. As a result, by the arrangement of the directional antenna 210 and the DUT 250, it increases the signal-to-noise (S/N) ratio of the testing signal received by the directional antenna 210, which further raises the accuracy of the testing result. In some embodiments, one portion of the directional antenna 210 which is adjacent to the DUT 250 is not covered with metal, and the rest portions of the directional antenna 210 are covered with metal. The portion of the directional antenna 210 which is covered with metal could isolate the wireless testing signal. By arranging the DUT 250 at the position where is adjacent to the directional antenna 210 and toward the portion of the directional antenna 210 without covering with metal, the directional antenna 210 may only receive the testing signal with LOS outputted from the DUT 250, and isolate the testing signal with multipath and different intensity or/and phase that are generated by multiple reflections from inside of the testing chamber C.

Continuing the above description, the directional antenna 210 is coupled to the attenuator 230 which is outside the testing chamber C through the transmission line 240. The attenuator 230 may adjust the intensity of the testing signal received from the directional antenna 210 in order to decrease the power of the received testing signal, which is configured to simulate the situation that the received end (not shown) is far from the DUT 250. In some embodiments, the attenuator 230 may decrease the power of the testing signal sequentially based on the testing conditions which are set by the control device 220. In different embodiments, user may set the down-regulation functions of the attenuator 230 by the user interface of the attenuator 230 directly. For instance, after transmitting the testing signal received from the directional antenna 210 to the attenuator 230, the intensity of the testing signal is adjusted by the attenuator 230 with the testing conditions including decreasing the intensity of the testing signal by 10 dB, 20 dB, . . . etc., in order to simulate the corresponding conditions including the distance between the received end and the DUT 250 by 5 m, 10 m, . . . , etc. The received end refers to the position of the directional antenna 210; with understanding in simulation, when the electronic device uses wireless transmission function, the received end refers to the position where the user relative to the electronic device is located. The method in which the attenuator 230 decreases the power of the testing signal is merely for illustration, and is not limited herein. The various methods in which the attenuator 230 decreases the power of the testing signal are within the scope of the present disclosure.

In some embodiments, the control device 220 is a computer or a device including functions of storing and computing. In some embodiments, the control device 220 may switch the wireless transmission functions, such as switching on/off Bluetooth and WiFi, of the DUT 250 by executing the testing program. In different embodiments, the control device 220 may also set the decreasing degree of the testing signal within the attenuator 230 by executing the testing program. In some embodiments, the control device 220 may execute the testing program in order to process (e.g. compute and analyze) the testing signal after testing the DUT 250, and generate the testing result.

Figure 3:
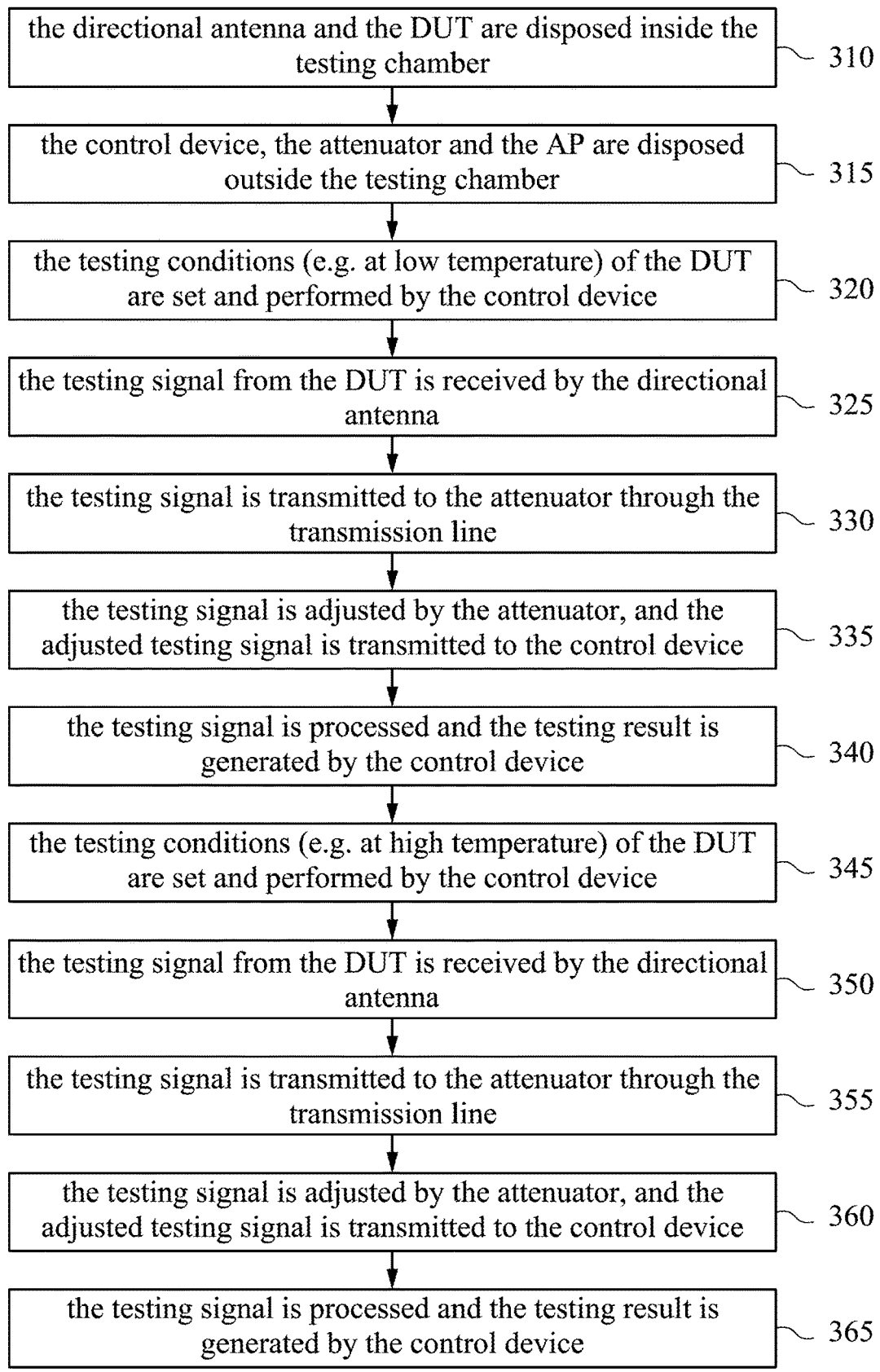
FIG. 3 is a flowchart of wireless transmission performance test method, in accordance with one embodiment of the present disclosure.

FIG. 3 is a flowchart of wireless transmission performance test method, in accordance with one embodiment of the present disclosure. For easy and clear illustration, the wireless transmission test method 300 described as followings is an embodiment based on the wireless transmission test system 200 shown as FIG. 2, which is not limited herein.

As shown in FIG. 2 and FIG. 3, in operation 310, when testing the wireless transmission performance of the DUT 250, the directional antenna 210 and the DUT 250 are disposed inside the testing chamber C. In some embodiments, in operation 310, the directional antenna 210 is disposed adjacent to the DUT 250, and the signal coupling direction of the directional antenna 210 is directed to the DUT 250.

In operation 315, the control device 220, the attenuator 230 and the AP 260 are disposed outside the testing chamber C. In some embodiments, the control device 220, the attenuator 230 and the AP 260 are disposed as the arrangement with connection relationship which is based on the illustration shown as FIG. 2.

In operation 320, the testing conditions (e.g. at low temperature) of the DUT 250 are set and performed by the control device 220. In some embodiments, operations 320, 325, 330, 335, 340 are performed under the testing conditions with low temperature. In some embodiments, the testing conditions with low temperature refer to the temperature inside the testing chamber C which is lower than the room temperature (e.g. 25° C.). For instance, the testing conditions with low temperature include the settings of the temperature at 10° C. and the humidity at 60%. In some embodiments, the user interface of the testing chamber C may set the temperature and the humidity inside the testing chamber C. In this case, the DUT 250 is disposed inside the testing chamber C, and is under the testing conditions with low temperature. Meanwhile, based on the testing conditions set by the control device 220, the DUT 250 performs one or more wireless transmission functions, in order to output the testing signal.

The testing conditions may correspond to the testing functions which are performed during executing the testing program, or correspond to the corresponding settings of the system 200. In some embodiments, the testing functions which are performed during executing the testing program include the wireless transmission function items and time sequence for the DUT 250, the signal quality that corresponds to at least one receiving distance in wireless transmission function simulation, and the like. In some embodiments, the corresponding settings of the system 200 include switching on/off the hardware device for wireless transmission of the DUT 250, setting the down-regulation functions of the attenuator 230, and the like. The method and context of setting the testing conditions are merely for illustration, various implemented methods of testing conditions are within the scope of the present disclosure, which is not limited herein.

In some embodiments, after disposing the DUT 250 inside the testing chamber C for a while, when the environmental conditions inside the testing chamber C reach equilibrium, the operations 325, 330, 335, and 340 are performed continuously, described as follows.

In operation 325, the testing signal from the DUT 250 is received by the directional antenna 210. As described above, since the testing signal received by the directional antenna 210 is the signal with LOS, the testing signal has good S/N ratio.

In operation 330, the testing signal is transmitted to the attenuator 230 through the transmission line 240. Then, in operation 335, the testing signal is adjusted by the attenuator 230, and the adjusted testing signal is transmitted to the control device 220. In some embodiments, the attenuator 230 adjusts the testing signal by decreasing at least one degree of the intensity (dB) of the testing signal, in order to simulate at least one specific distance between the directional antenna 210 and the DUT 250 correspondingly. Besides, the adjusted testing signal may be transmitted to the control device 220 through the AP 260 by the attenuator 230, as such reducing the physical transmission line between the control device 220 and the attenuator 230, in order to be easy for performing the whole testing operation. Then, in operation 340, the testing signal is processed and the testing result is generated by the control device 220.

For further illustration, in some embodiments, the attenuator 230 is performed to decrease the intensity of the testing signal by several different degrees, in order to simulate different distances between the DUT 250 and the received end correspondingly. For instance, the degree is increased by one for every 10 dB, and the intensity of the testing signal is decreasing sequentially until the intensity of the testing signal has been adjusted within 80 dB. Once the testing signal has been adjusted by the attenuator 230, the adjusted testing signal is transmitted to the control device 220. The operation 340 is performed continuously, and then the operation is returned to the operation 335 repeatedly for adjusting the intensity of the testing signal by the next degree. Namely, whenever the testing signal is received and adjusted by the attenuator 230, the adjusted testing signal is processed and the testing result is generated by the control device 220. Based on the testing conditions, the operations 325, 330, 335, and 340 are repeated sequentially, in order to generate the corresponding testing results.

Similarly, in operation 345, the testing conditions (e.g. at high temperature) of the DUT 250 are set and performed by the control device 220. In some embodiments, operations 345, 350, 355, 360, and 365 are performed under the testing conditions with high temperature. In some embodiments, the testing conditions with high temperature refer to the temperature inside the testing chamber C which is higher than the room temperature (e.g. 25° C.). For instance, the testing conditions with high temperature include the settings of the temperature at 40° C. and the humidity at 80%. In some embodiments, the user interface of the testing chamber C may set the temperature and the humidity inside the testing chamber C. In this case, the DUT 250 is disposed inside the testing chamber C, and is under the testing conditions with high temperature. Meanwhile, based on the testing conditions set by the control device 220, one or more wireless transmission functions are performed by the DUT 250, in order to output the testing signal.

In some embodiments, after disposing the DUT 250 inside the testing chamber C for a while, when the environmental conditions inside the testing chamber C reach equilibrium, the operations 350, 355, 360, and 365 are performed continuously, wherein the operations 350, 355, 360, and 365 are similar and correspond to the operations 325, 330, 335, and 340 respectively, which is not described repeatedly herein.

It should be noted that the environmental conditions including low temperature as set in the operation 320 and the environmental conditions including high temperature as set in the operation 345, they are some sort of testing conditions of the DUT 250, which is merely for illustration, and they are able to be substituted with other conditions including different temperatures or humidity. In some embodiments, the order between the operation 320 and the operation 345 is able to be switched. In different embodiments, the method 300 further includes another set of operations 320, 325, 330, 335, and 340, which is a set with the same environmental conditions, configured to test the other testing conditions rather that with low temperature. In different embodiments, based on the testing requirements of the DUT 250, the number of the said sets of operations may be adjusted in the method 300, which is configured to implement the testing operation with multiple testing conditions, and the sets of operations are performed in continuous operations of the method 300. For instance, the number of the sets of operations may be increased or decreased, which is not limited herein.

Figure 4:
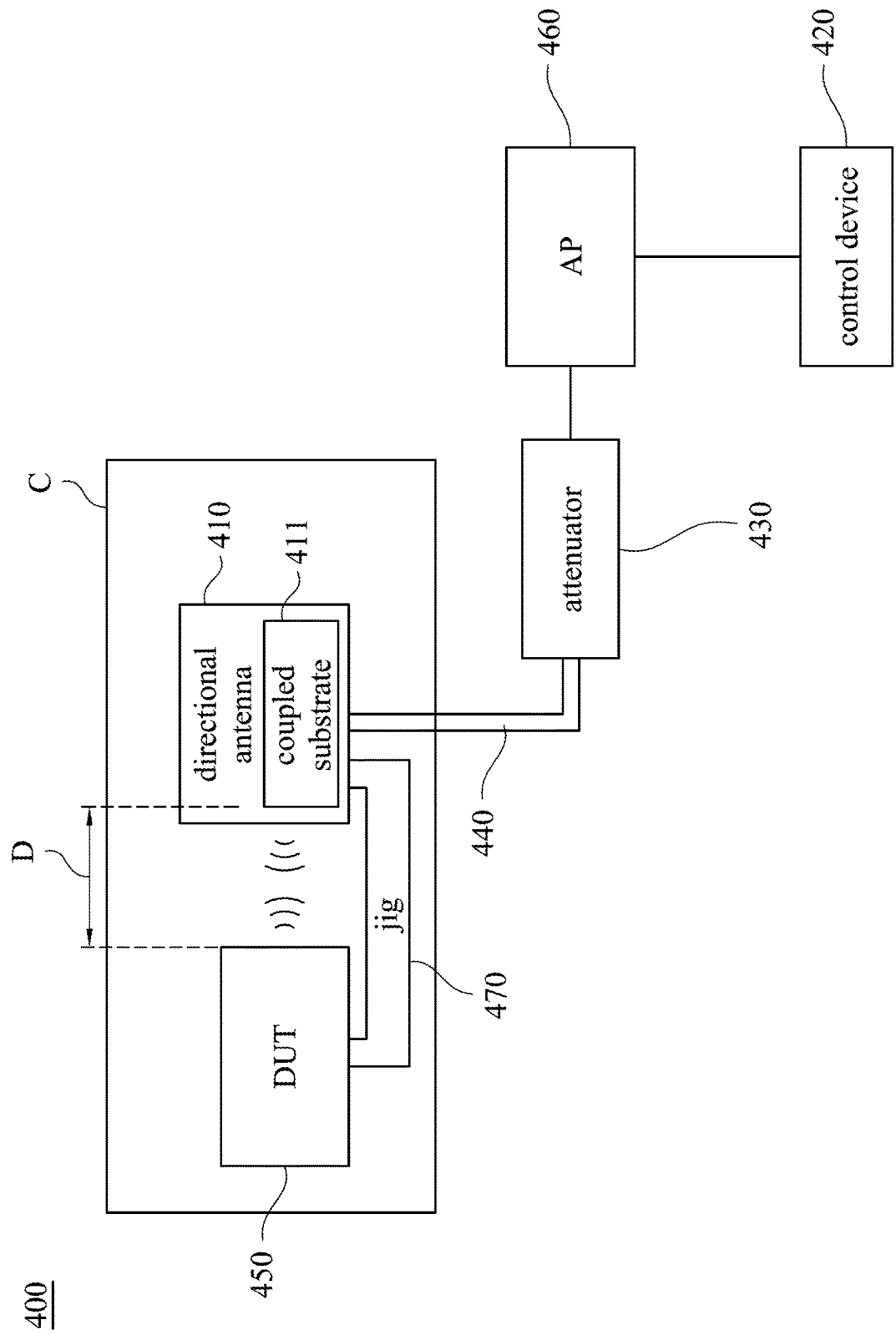
FIG. 4 is a flowchart of wireless transmission performance test method, in accordance with one embodiment of the present disclosure.

Besides, another embodiment is provided by the present disclosure, as shown as FIG. 4, the wireless transmission performance test system 400 includes a directional antenna 410, an attenuator 430, a radio frequency cable (RF cable) 440, an AP 460, a jig 470 and a control device 420. The directional antenna 410, the jig 470, and a portion of the RF cable 440 are disposed inside the testing chamber C, and the remaining elements including the attenuator 430, a portion of the RF cable 440, the AP 460 and the control device 420, are disposed outside the testing chamber C. The directional antenna 410 is coupled to the DUT 450 and the attenuator 430. In some embodiments, the directional antenna 410 is coupled to the attenuator 430 through the RF cable 440 which is configured to transmit the testing signal with high frequency. The attenuator 430 is coupled to the directional antenna 410 through the RF cable 440, and the attenuator 430 is coupled to the AP 460. The AP 460 is coupled to the control device 420. The embodiments described in FIG. 4 are similar to that in FIG. 2, therefore, the difference between them are illustrated as follows in the present disclosure rather than the same.

As shown in FIG. 4, the directional antenna 410 is one sort of flat type antenna coupler and includes the coupled substrate 411. In some embodiments, the coupled substrate 411 is a platform structure, and the coupled substrate 411 includes the connected via (not shown). The connected via is configured to couple one end of the RF cable 440 and is coupled to the control device 420 through the RF cable 440. As a result, the testing signal generated by the DUT 450 after testing may be received by the coupled substrate 411, and be transmitted to the attenuator 430 through the RF cable 440.

In some embodiments, the surroundings of the coupled substrate 411 further include a metal shield (not shown). The metal shield is disposed around the coupled substrate 411 and covers part of the space between the coupled substrate 411 and the DUT 450. The testing signal with multipath reflected inside the testing chamber C may be blocked by the metal shield, which increases the S/N ratio of the testing signal received by the coupled substrate 411 and further raises the accuracy of the testing results.

In some embodiments, the jig 470 is configured to hold the directional antenna 410 and the DUT 450, and fix the directional antenna 410 at the position where is adjacent to the DUT 450, in order to dispose the directional antenna 410 and the DUT 450 easily, wherein the interval between the directional antenna 410 and the DUT 450 is a specific distance D. In some embodiments, the distance D is in a range of 1 to 10 mm, which makes the S/N ratio of the testing signal received by the directional antenna 410 is appropriate. In some embodiments, under the testing conditions with specific high frequency signal, the distance D is less than 3 mm, in order to obtain the appropriate S/N ratio and further generate the accurate result by the control device 420.

To conclude, various wireless transmission performance of the DUT may be tested under the specific environmental conditions, such as at the temperature which is higher or lower than the room temperature, with the wireless transmission performance test system and method. During the testing, since the signal coupling direction of the directional antenna is directed to the DUT, the S/N ratio of the testing signal received by the directional antenna may be good, and the testing result generated by the control device may also be accurate.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A wireless transmission performance test system, configured to test wireless transmission performance of a device under test (DUT) which is disposed in a testing chamber, comprising:

a directional antenna, disposed inside the testing chamber and adjacent to the DUT to receive testing signal generated by the DUT after testing, wherein signal coupling direction of the directional antenna is directed to the DUT, wherein a portion of the directional antenna which is adjacent to the DUT is not covered with metal and a rest portion of the directional antenna which is not adjacent to the DUT is covered with metal, such that the directional antenna receives a line-of-sight (LOS) testing signal outputted from the DUT; and a control device, coupled to the directional antenna, and configured to receive the testing signal transmitted from the directional antenna, process the testing signal, and generate testing result, wherein material inside the testing chamber is metal.

2. The wireless transmission performance test system of claim 1, further comprising:

an attenuator, coupled between the directional antenna and the control device.

3. The wireless transmission performance test system of claim 2, further comprising:

a radio frequency cable, wherein the directional antenna is coupled to the attenuator through the radio frequency cable.

4. The wireless transmission performance test system of claim 1, wherein the directional antenna is a flat type antenna coupler and the directional antenna comprises a coupled substrate coupled to the control device through a transmission line.

5. The wireless transmission performance test system of claim 1, wherein a distance between the directional antenna and the DUT is in a range of 1-10 mm.

6. The wireless transmission performance test system of claim 1, further comprising:

an attenuator, configured to adjust the testing signal transmitted from the directional antenna, and transmit the adjusted testing signal to the control device; and a radio frequency cable, configured to transmit the testing signal outputted from the directional antenna to the attenuator.

7. The wireless transmission performance test system of claim 1, further comprising:

a jig, disposed inside the testing chamber and configured to fix the directional antenna at a position that is adjacent to the DUT.

8. The wireless transmission performance test system of claim 1, wherein the wireless transmission performance of the DUT is tested under an environmental condition inside the testing chamber, and the environmental condition is set via a user interface of the testing chamber.

9. A wireless transmission performance test method, for testing wireless transmission performance of a device under test (DUT), comprising:

disposing a directional antenna and the DUT inside a testing chamber, wherein signal coupling direction of the directional antenna is directed to the DUT;

disposing a control device coupled to the directional antenna;

receiving testing signal from the DUT by the directional antenna, wherein a portion of the directional antenna which is adjacent to the DUT is not covered with metal and a rest portion of the directional antenna which is not adjacent to the DUT is covered with metal, such that the directional antenna receives a line-of-sight (LOS) testing signal outputted from the DUT; and receiving the testing signal transmitted from the directional antenna by the control device, processing the testing signal, and generating testing result by the control device.

10. The wireless transmission performance test method of claim 9, further comprising:

transmitting the testing signal outputted from the directional antenna to an attenuator through a radio frequency cable; and adjusting the testing signal transmitted from the directional antenna, and transmitting the adjusted testing signal to the control device by the attenuator.

\* \* \* \* \*